United States Patent

Lair et al.

[15] 3,659,423
[45] May 2, 1972

[54] MOVEABLE ROCKET

[72] Inventors: Robert C. Lair; Julia H. Pakurar, both of Akron; Edward G. Stricker, North Canton, all of Ohio

[73] Assignee: Goodyear Aerospace Corporation, Akron, Ohio

[22] Filed: Sept. 17, 1964

[21] Appl. No.: 397,136

[52] U.S. Cl. ..................................60/232, 239/265.19
[51] Int. Cl. .........................................F02k 1/24
[58] Field of Search.............60/35.55, 35.54, 35.6 N; 239/265.11, 265.19, 265.35

[56] References Cited

UNITED STATES PATENTS

| | | | |
|---|---|---|---|
| 3,132,479 | 5/1964 | Kuhn, Jr. | 60/35.55 |
| 3,184,917 | 5/1965 | Caouette et al. | 60/35.55 |
| 3,208,215 | 9/1965 | Brown | 60/35.55 |
| 3,032,982 | 5/1962 | Gaubatz | 60/35.55 |
| 3,039,264 | 6/1962 | Ernest | 60/35.55 |
| 3,049,877 | 8/1962 | Sherman | 60/35.55 |
| 3,243,124 | 3/1966 | Lee | 60/35.6 N |

Primary Examiner—Samuel Feinberg
Attorney—A. H. Oldham

EXEMPLARY CLAIM

1. In a rocket motor exhaust nozzle the combination of a nozzle body defining a venturi throat, an insert wear ring to protect the venturi throat of the nozzle body, a fixed annular mounting base removably receiving the nozzle body, a flexible seal membrane effecting a sealed relationship between the mounting base and the nozzle body, and allowing controlled relative movement therebetween, a concentric ring operatively mounted by said seal membrane between the nozzle body and the mounting base, first means pivotally mounting said nozzle body to said concentric ring, second means pivotally mounting said mounting base to said concentric ring at 90° relation to said first pivotal mounting means to achieve a gimbal effect between said nozzle body and said mounting base, and means to controllably and selectively apply pressure to the nozzle body to effect pivoting thereof to a desired relation with respect to the mounting base.

9 Claims, 6 Drawing Figures

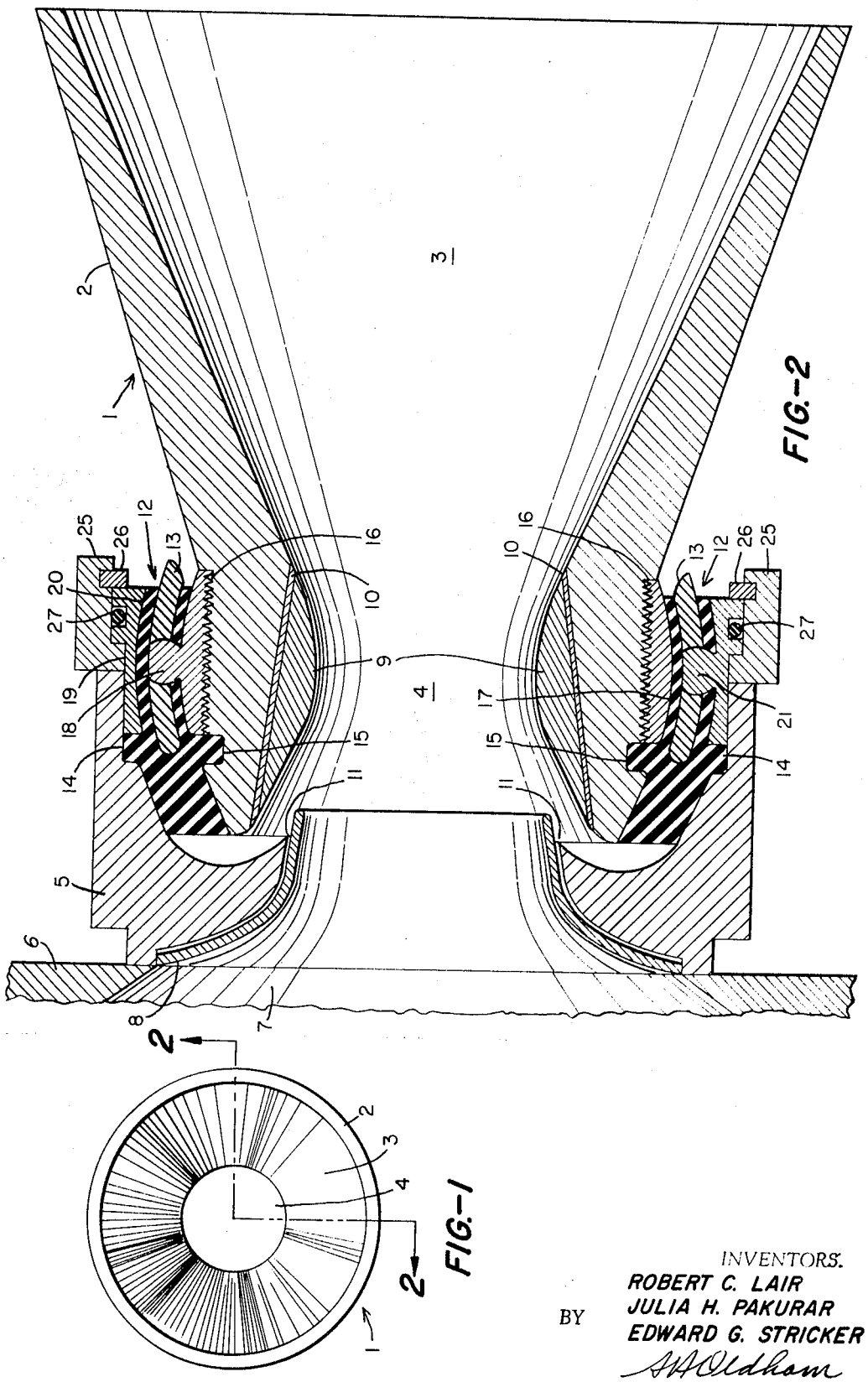

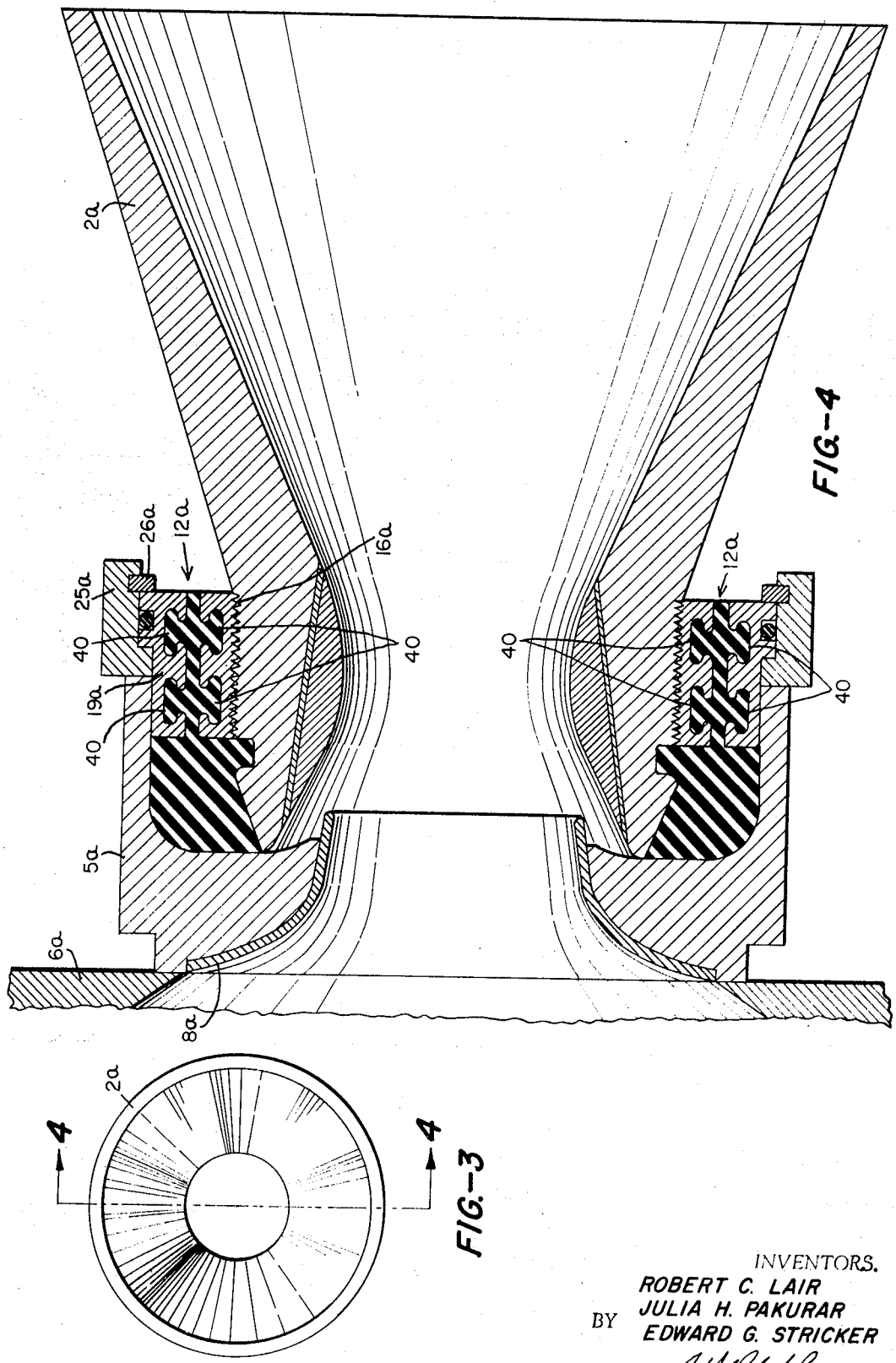

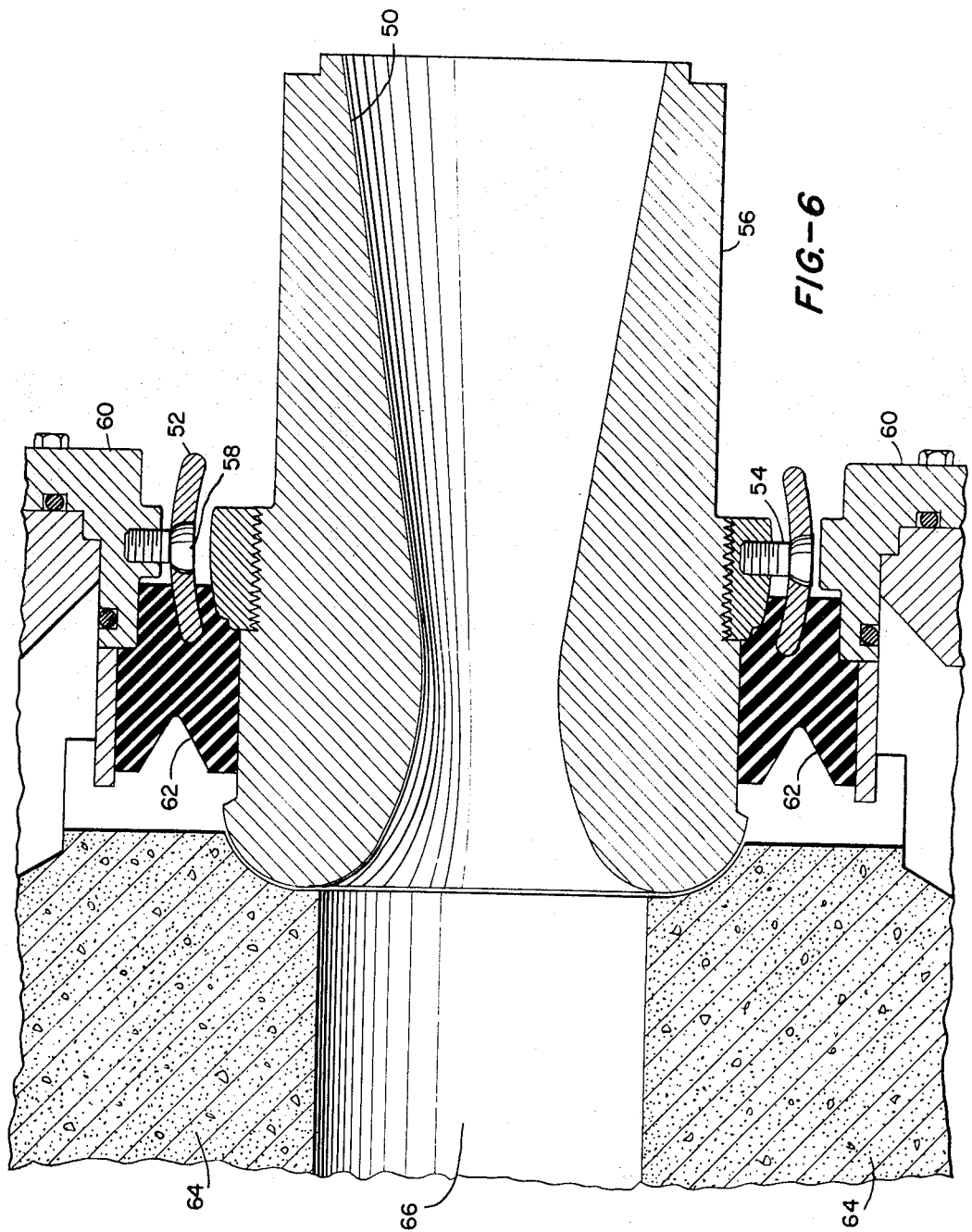

MOVEABLE ROCKET

This invention relates to a movable rocket motor nozzle, and more particularly to utilization of an elastomeric ring in an omni-axis hinged nozzle, a single axis hinged nozzle, and in an omni-axis unhinged nozzle to provide vector control for either a solid or liquid propellant rocket system. The invention specifically contemplates utilization of an elastomeric ring for mounting any nozzle to a rocket casing.

A conventional movable type nozzle control system for rocket propelled guided missiles generally requires four nozzles for attitude and roll control with the thrust normally divided between two sets of nozzles. One half of the thrust is allotted to the pitch nozzles for pitch control only, and the remaining thrust is available at the yaw nozzles for yaw control only. It is obvious, then, that the primary factor limiting pitch or yaw control is the availability of only one-half of the thrust for deflection. Further, these systems require multiple nozzles (i.e. usually at least four), require a complex nozzle design and hinged mounting which is quite expensive and adds considerably to the cost of the hardware. Also, this design increases the system size resulting in an increased weight which must be overcome by added rocket thrust or propellant burning time. Generally, in this type of hinge mounted rocket nozzle, the machining aspects and tolerance for the interrelated parts requires great accuracy, thereby further increasing expense with attendant low system reliability.

It is the general object of the present invention to avoid and overcome the foregoing and other difficulties of an objection to prior art practices by the provisions of a movable rocket motor nozzle which is gimbal mounted in sealed relationship by an elastomeric ring with the rocket casing so that its thrust vector can be positioned at any vector degree to provide complete stability for attitude and roll control for a rocket propelled guided missile.

A further object of the invention is that the nozzle be capable of increasing vector efficiency under increasing side thrust requirement by reducing corresponding large angles of deflection normally required resulting in less stringent requirements on nozzle materials.

A further object of the invention is to provide a seal between the nozzle body and the mounting base which is flexible and allows controllable relative movement therebetween, and which further reduces the requirement for precision fitting between the parts resulting in decrease in construction costs and an increase in reliability.

A further object of the invention is to provide a movable rocket motor nozzle which is in sealed relationship to the rocket body with a nozzle entry cap utilized to protect the seal.

A further object of the invention is to provide a movable rocket motor nozzle which utilizes a gimbal mounting to achieve a bi-axial vectoring ability so that pitch or yaw control is doubled by virtue of the fact that all of the thrust is available for vector control on either plane.

A further object of the invention is to provide a movable rocket motor nozzle with great simplicity of design, no passages or joints to collect exhaust products, and wherein manufacturing costs are greatly reduced and reliability increased.

The aforesaid objects of the invention and other objects which will become apparent as the description proceeds are achieved by providing in a rocket motor exhaust nozzle the combination of a rocket motor adapted to burn fuel and create hot gasses of combustion, a mounting base operatively affixed to the base of the rocket motor, a nozzle body removably received by the mounting base to exhaust the hot gasses of combustion, a flexible member operatively affixed to the nozzle body and the mounting base to effect a seal and allow a limited degree of relative movement therebetween, and means to selectively apply force to the nozzle body to deflect the axis thereof with respect to the rocket motor.

For a better understanding of the invention reference should be had to the accompanying drawings wherein:

FIG. 1 is a plan view of a movable nozzle representing one embodiment of the invention;

FIG. 2 is an enlarged broken away vertical cross sectional view of the nozzle taken on the line 2—2 of FIG. 1;

FIG. 3 is a plan view of a movable nozzle representing another embodiment of the invention;

FIG. 4 is an enlarged broken away vertical cross sectional view of the nozzle taken on the line 4—4 of FIG. 3;

FIG. 6 is an enlarged broken away vertical cross sectional view of a nozzle employing another embodiment of the invention.

Figure 5:
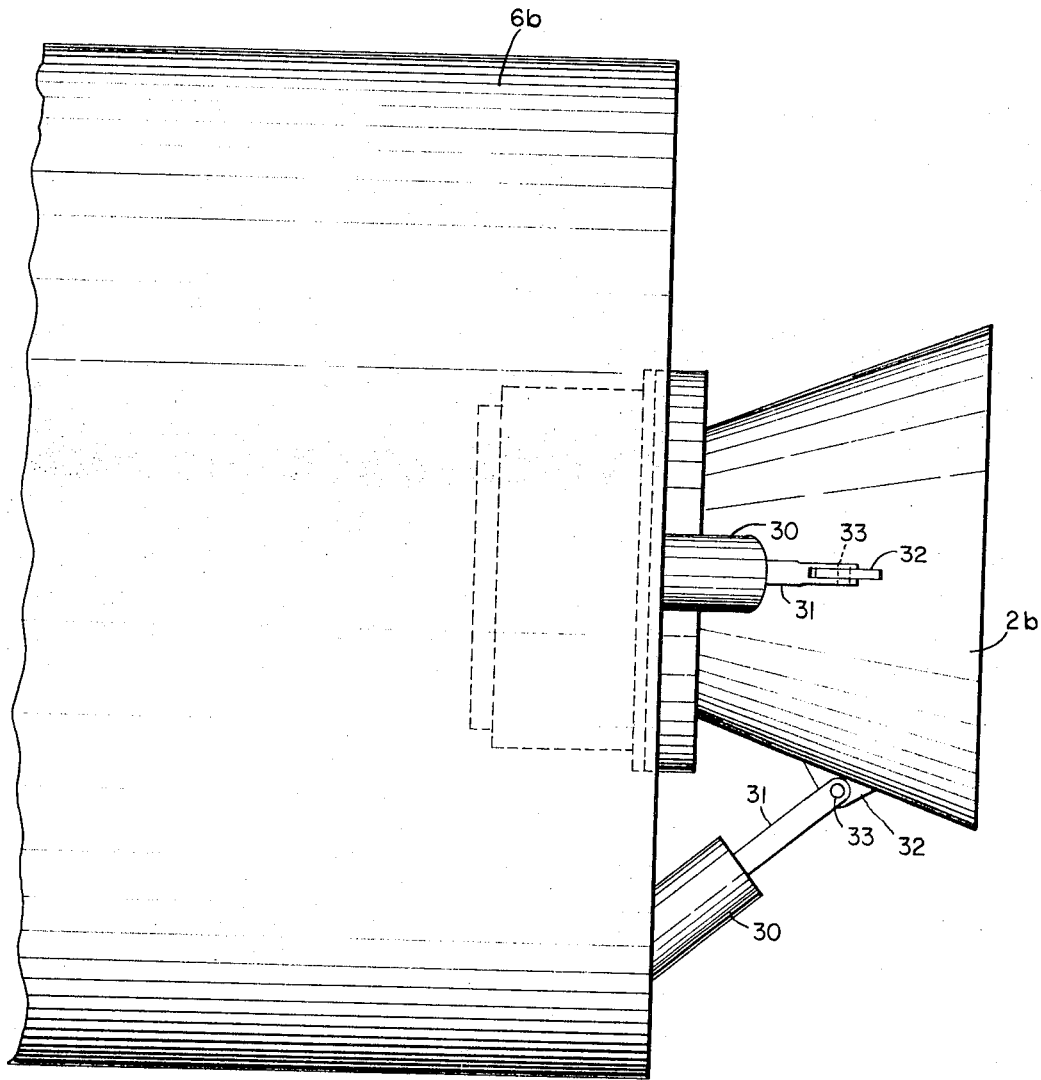
FIG. 5 is an elevational view of a movable rocket nozzle employing one of the embodiments of the invention showing a deflection means associated therewith.

With reference to the form of the invention illustrated in the drawings, and particularly FIGS. 1 and 2, the numeral 1 indicates generally a movable rocket motor nozzle comprising a nozzle body 2 defining an expanding throat 3 extending from a venturi throat 4. A mounting base 5 is operatively affixed in anchored relationship to a rocket motor casing 6. The rocket motor casing 6 contains a hot gas exhaust port 7 which is in communication with a nozzle entry cap 8 leading into the venturi throat 4 of the nozzle body 2. The nozzle entry cap 8 also serves as a gas baffle for protection, as will be more fully explained hereinafter. Because of the extremely hot combustive gasses passing into the venturi throat 4, a throat insert 9 may be provided as an annular ring actually describing the venturi throat 4. Normally, the invention contemplates that the throat insert 9 will be made from tungsten affixed to insulated mounting base 10. Likewise, the nozzle entry cap will generally be made from tungsten and held in place with a insulated mounting base 11.

As an important feature of the invention, the bottom portion of the nozzle body 2 is removably positioned in relation to the mounting base 5 by means of a flexible seal membrane or elastomeric ring, generally indicated by numeral 12. The invention contemplates that the longitudinal axis of the nozzle body will substantially coincide with the longitudinal axis of the mounting base 5. The membrane or ring 12 is contemplated to be made from a suitable resilient and elastic base material such as that manufactured by The Goodyear Tire & Rubber Company under the compound No. Code R108X811. The membrane or ring 12 operatively carries a concentric annular ring 13 which is molded in place therein. In fact, it is contemplated that the membrane or ring 12 will be vulcanized, molded, or bonded in some suitable manner to the nozzle body 2 and the mounting base 5, with raised beaded portions 14 and 15 insuring a proper positioning and interlocking relation therebetween.

This approach utilizing the membrane or ring 12 solves problems associated with thermal barriers, concentricity requirements, seal requirements, and heavyweight gimbal requirements. The membrane or ring 12 will ablate with time from heat during rocket motor operation to facilitate nozzle actuation as more particularly described hereinafter. Also, the membrane or ring 12 acts as an automatic compensation for fabrication and thermal eccentricities and structurally supports the annular ring 13 which, by itself, would be of insufficient strength for motor pressure loads imposed.

In order to provide a gimbaled mounting between the nozzle body 2 and the mounting base 5, it is contemplated that an annular ring 16 will be threadably received upon the outer surface of the nozzle body 2, substantially in alignment with the plane of the venturi throat 4. The ring 16 has a slightly curved outer surface 17, as best seen on the right hand side of FIG. 2, so as to help effect the gimbaled motion between the nozzle body 2 and the mounting base 5 through the membrane 12. In order to effect the pivotal mounting, a raised substantially ball-shaped post 18 is operatively received in pivotal relation with the concentric annular ring 13. While only one post 18 is shown in FIG. 2, it should be understood, that a similar post pivotally engaging the ring 13 is mounted directly opposite thereto on the ring 16.

An outer concentric annular ring 19 having a curved inner surface 20, as best seen on the left side of FIG. 2, is removable carried by the mounting base 5, and is adapted to be in concentric alignment with the ring 13 and the ring 16 while riding on the membrane 12. In order to provide a pivotal relationship between the base member 5 and the nozzle body 2, and to complete the gimbal mounting, the ring 19 has a substantially ball-shaped post 21 extending therefrom and engaging with the concentric ring 13, as clearly shown on the right hand side of FIG. 2. It should also be understood that a similar post pivotally engaging the ring 13 is mounted directly opposite thereto on the ring 19. Thus, it is seen that the posts 18 pivotally mounting the nozzle body 2 to the ring 13 and the posts 21 pivotally mounting the body 5 to the ring 13 in effect achieve a gimbal mounting of the nozzle body 2 in relation to the mounting base 5. The respective pivotal posts 18 and 21 are at 90° angles to each other, as is shown by the cut line of FIG. 1.

In order to securely hold the outer annular ring 19 in position relative to the base 5 and the membrane 12, a locking ring 25 may be provided which incorporates a small clamping ring 26 therewith extending over the top of the outer ring 19. A rubber O-ring seal 27 may be provided between the locking ring 25 and the outer concentric ring 19 in order to insure a proper seal therebetween.

It should be noted that there is considerable clearance between the bottom of the nozzle body 2 and the membrane 12 in relation to the nozzle entry cap 8 so that substantial pivoting between the nozzle body 2 and the mounting base 5 may be effected. The invention contemplates that deflections of between about 1° and about 16° are possible. Initially, of course, the axis of the nozzle body 2 is substantially in alignment with the axis of the rocket body 6 and the nozzle entry cap 8, and it is contemplated that this alignment will be resumed automatically after any deflection of the nozzle body 2 therefrom, when the deflection forces have been removed. In other words, the elastic memory of the membrane 12 will return the initial uniform alignment, as illustrated, after any deflection forces to control the direction of the rocket flight have been applied.

FIGS. 3 and 4 represent another embodiment of the invention which is substantially similar to that embodiment shown in FIGS. 1 and 2, except that there is not a gimbaled mounting between the nozzle body and the mounting base. The parts similar to those of FIGS. 1 and 2 have been designated with similar numbers with the suffix a thereafter. The only actual difference is that flexible seal membrane 12a, again made of an elastic material, has a plurality of raised undercut ribs 40 of interlocking shape to effect an interlocking seal between an inner concentric ring 16a threadably received upon a nozzle body 2a and an outer concentric ring 19a secured to a mounting base 5a and held in place by a locking ring 25a and a clamping ring 26a. It should be noted that in this arrangement, there are no actual defined pivots, so that hardware construction is further simplified. Pivotal movement can be at any angle. However, it may be necessary to make the membrane 12a a little stiffer to properly withstand the forces and temperatures involved so that higher actuation forces may be necessary. Again, the membrane may be molded in place with the ribs 40 interlocking the membrane 12a to the rings 16a and 19a. Again, a nozzle entry cap 8a is provided to guide hot gasses of combustion from a rocket motor casing 6a into the nozzle body 2a.

It is an important feature of the invention that the nozzle entry caps 8 and 8a in FIGS. 2 and 4 actually extend partially into the nozzle bodies 2 and 2a so as to provide baffles to minimize direct impingement of hot gasses of combustion against the membranes 12 and 12a. It should be noted with respect to FIG. 4 that the nozzle body 2a actually extends down to close spaced adjacent relationship to the mounting base 5a. In operation a gap will exist here as in FIG. 2 as the motor pressure will stretch the membrane a preset amount.

FIG. 5 illustrates one possible method of actuation to a nozzle body 2b. In this instance, a rocket casing 6b has actuating cylinders 30 mounted thereon at substantially 90° displacement around the nozzle body 2b. The cylinders 30 actuate plungers 31 which are pivotally connected to ears 32 affixed to the nozzle body 2b by means of pins 33. The invention contemplates that the actuating cylinders 30 will be mounted substantially in alignment with the pivotal mounting of the embodiment of the invention illustrated in FIG. 2, whereas the actual location with respect to the embodiment of FIG. 4 is not important. The cylinders 30 will be actuated in accordance with guidance signals from the missile or rocket itself. The guidance signal actuation mechanism does not comprise a portion of this invention.

FIG. 6 illustrates another embodiment of the invention similar to that shown in FIG. 2 except that a nozzle body 50 is slightly different in configuration and is submerged into the propellant cavity. A gimbal omni directional mounting is utilized and effected by a concentric ring 52 pivotally mounted by a pin 54 secured to a frame 56 of the nozzle body 50, and a pin 58 operatively secured to the rocket housing 60. A elastomeric seal membrane 62 is integrally molded between the nozzle body 50 and the rocket housing 60, and to at least the bottom portion of the ring 52. The fabrication of the membrane 62 is of critical importance in this embodiment as the nozzle body 50 extends adjacent to a propellant 64 having a core 66 substantially aligned with the nozzle body 50. Thus, it can be seen that the surface of the membrane 62 will be directly exposed to the heat and flame of the propellant 64 as it burns to produce hot gasses of combustion. In this instance, that portion of the membrane 62 below the ring 52 ablates away during burning of the propellant 64. Therefore, the thickness of the membrane 62 and its heat resistant qualities are dependent upon the temperature and firing time or burning time of the propellant 64. That portion of the membrane 62 molded to the ring 52 must withstand the pressure developed upon the nozzle body 50 by the burning of the propellant 64. Therefore, there may be instances where the membrane 62 will actually be made of two separate and distinct elastomeric substances, namely, one to ablate away under the heat and fire dependent upon burning time, and one to support the gimbal mounting and withstand the pressures placed on the nozzle body 50 to thrust it out of the rocket body 60. This particular embodiment of the invention with the nozzle body recessed to be in adjacent relation to the propellant 64 is most adaptable to a single nozzle rocket where the nozzle is aligned with the propellant core. By submerging a reduced length is required for nozzling to increase the length allowed for propellant in volume-limited systems.

Thus, it is seen that the objects of the invention have been achieved by providing a rocket motor nozzle body mounted in a flexibilized manner by an elastomeric ring in a fixed mounting base adapted to receive the exhaust gasses of a rocket motor, which flexible mounting, either in a gimbal pivotal relationship, or a completely flexible relationship makes possible the vector adjustment of the nozzle by external application to the nozzle body of one actuation load or several simultaneous actuation loads. The nozzle body movement thereby achieved is utilized to directionally control the propulsive gasses emitted from a rocket motor. Secondary functions of the flexibilized seal membrane is to provide a seal to contain the rocket motor chamber pressure, or the pressure of the hot gasses of combustion while further providing compensation for fabrication eccentricities and heating distortions of the nozzle which may occur before assembly, or during actual rocket motor operation. Also, the nozzle entry cap design provides a method for isolating the flexibilized seal membrane from the deleterious effects of propellent gas temperature, and propellent exhaust product deposits and erosion therefrom.

This rocket motor control may be used to provide a missile system with the three standard controls of pitch, yaw and roll by the use of only two nozzles which thereby allows full nozzle pressure for each control function. Further, where a separate system is contemplated for roll control, such as fins, etc., only one nozzle would be necessary to provide the missile system with pitch and yaw capabilities.

While the invention has only been illustrated and described with relation to an omni-axis gimbaled and omni-axis system, it could be utilized with a single axis hinged system as well. The elastomeric seal membrane mounting is actually usable with any nozzle which has been successfully used heretofore.

It should also be understood that the great simplicity in this design, with no passages or joints to collect exhaust products and with nozzle quantity requirements reduced to one-half, means that fabrication costs are reduced by at least one-half. Further, actual tests on a movable rocket motor nozzle disclosed herein have shown that a remarkably small increase in actuation pressure requirements is necessary as motor sizes increase. For example, actuation force increases of only fine times were required for a 200,000 pound thrust motor as compared with a 16,000 pound thrust motor. This system, because of the reduced number of nozzles, and the associated structure therewith, means less weight to a missile system, a further reduction in costs, and greater missile reliability.

While in accordance with the Patent Statutes, only one best known embodiment of the invention has been illustrated and described in detail, it is to be particularly understood that the invention is not limited thereto or thereby, but that the inventive scope is defined in the appended claims.

What is claimed is:

1. In a rocket motor exhaust nozzle the combination of
   a nozzle body defining a venturi throat,
   an insert wear ring to protect the venturi throat of the nozzle body,
   a fixed annular mounting base removably receiving the nozzle body,
   a flexible seal membrane effecting a sealed relationship between the mounting base and the nozzle body, and allowing controlled relative movement therebetween,
   a concentric ring operatively mounted by said seal membrane between the nozzle body and the mounting base,
   first means pivotally mounting said nozzle to said concentric ring,
   second means pivotally mounting said mounting base to said concentric ring at 90° relation to said first pivotal mounting means to achieve a gimbal effect between said nozzle body and said mounting base, and
   means to controllably and selectively apply pressure to the nozzle body to effect pivoting thereof to a desired relation with respect to the mounting base.

2. A rocket exhaust nozzle as called for in claim 1 where baffle means are operatively connected to the mounting base to protect the flexible seal membrane from hot gases.

3. In a rocket motor exhaust nozzle the combination of a rocket motor, exhausting hot gases of combustion when operative,
   an annular mounting base operatively mounted to the rocket motor to receive said hot gases of combustion therefrom,
   a nozzle body mounted in gimbaled relation to the mounting base to be tiltable in any direction so as to direct the flow of said hot gases of combustion from the mounting base,
   a resilient seal membrane totally surrounding the gimbaled mounting of the nozzle body thereby normally resiliently holding the nozzle in axial alignment with the rocket motor and effecting a sealed relationship between the mounting base and the nozzle body, and allowing controlled resilient relative movement therebetween, and
   means to controllably and selectively apply pressure to the nozzle body to effect pivoting thereof to a desired relation with respect to the mounting base to control the force vector applied to the rocket motor.

4. In a rocket motor exhaust nozzle the combination of
   a rocket motor adapted to burn fuel and create hot gases of combustion,
   a mounting base having a centrally aligned hole therethrough operatively affixed to the base of the rocket motor to receive the hot gases of combustion,
   a nozzle body concentrically positioned on said mounting base to exhaust said hot gases of combustion into the atmosphere,
   a resilient nozzle mounting ring having its internal surface operatively affixed and interlocked around its entire inner circumference to said nozzle body and its external surface operatively affixed and interlocked around its entire outer circumference to said mounting base to effect a seal therebetween, to normally position said nozzle body in resilient axial alignment with the hole through the mounting base, and to allow a limited degree of resilient pivotal movement of the nozzle body relative to the mounting base, and
   means to selectively apply force to said nozzle body to deflect the axis thereof with respect to the rocket motor.

5. An exhaust nozzle according to claim 4 which includes an annular baffle affixed to the mounting base to direct the hot gases of combustion into the nozzle body and prevent any impingement of gases onto the membrane.

6. In a rocket motor exhaust nozzle the combination of
   a rocket motor adapted to burn fuel in a combustion chamber and create hot gases of combustion,
   a mounting base operatively affixed to the base of the rocket motor,
   an elongated nozzle body having an inlet opening passing into outlet passage all aligned on the axis of the body,
   means mounting the inlet opening end of the nozzle body in single axis pivotal to the mounting base so that the axis of the body substantially coincides with the axis of the base,
   a flexible elastomeric ring operatively molded to the mounting base and around the nozzle body to resiliently hold the nozzle body in position with respect to the mounting base and effect a seal between the mounting base and the nozzle body, said elastomeric ring directly receiving the full force of the hot gases of combustion in the combustion chamber during rocket motor firing and partially ablating while still maintaining the seal and supporting the mounting between the mounting base and the nozzle body, and
   means operatively mounted to the rocket motor to selectively apply force to said nozzle body to deflect the axis thereof with respect to the mounting base.

7. In combination
   a rocket motor adapted to burn fuel in the combustion chamber and create hot gases of combustion,
   an elongated nozzle body having a longitudinal exhaust bore therethrough substantially on the axis thereof being pivotally mounted to the rocket motor so the hot gasses of combustion are received in said exhaust bore,
   a flexible elastomeric ring operatively molded to the rocket motor and around the nozzle body to resiliently support the nozzle body in position with respect to the rocket motor and effect a hot gas seal therebetween, said elastomeric ring directly receiving the full force of the hot gases of combustion in the combustion chamber during rocket motor firing and partially ablating while still maintaining the seal and supporting the mounting between the rocket motor and the nozzle body, and
   means operatively mounted to the rocket motor to selectively control the pivotal relation of the nozzle body to the rocket motor.

8. In a rocket motor exhaust nozzle the combination of
   a rocket motor adapted to burn fuel and create hot gases of combustion,
   a mounting base operatively affixed to the base of the rocket motor,
   a nozzle body having an exhaust hole along the axis thereof removably received by said mounting base to exhaust said hot gases of combustion, an annular resilient membrane operatively interlocked around its entire inner and outer circumference to said nozzle body and said mounting base respectively to effect a seal and hold the nozzle body in operative relation to the base while allowing a limited degree of pivotal relative movement therebetween, means to baffle said hot gases of combustion exhausted by said nozzle body away from said membrane, and means to selectively apply force to said nozzle body to deflect the axis thereof with respect to the rocket motor.

9. In a rocket motor exhaust nozzle the combination of a rocket motor adapted to burn fuel and create hot gases of combustion, a mounting base operatively affixed to the base of the rocket motor, an elongated nozzle body having an inlet opening passing into a venturi throat and into an expanding outlet passage all aligned on the axis of the body, a flexible membrane operatively molded to the mounting base and the nozzle body to mount the nozzle body with its access opening received inside the mounting base so that the axis of the nozzle body substantially coincides with the axis of the mounting base, said membrane interlocking around its entire inner and outer circumference and between the mounting base and the nozzle body respectively to effect a seal therebetween and allow limited pivotal movement of the nozzle body with respect to the mounting base, and means operatively mounted to the base of the rocket motor to selectively apply force to said nozzle body to deflect the axis thereof with respect to the mounting base.

* * * * *